United States Patent [19]

Samuelian, Sr. et al.

[11] 3,814,360

[45] June 4, 1974

[54] BOWL SUPPORTING TURNTABLE FOR KITCHEN MIXER

[75] Inventors: Maurice P. Samuelian, Sr., West Hartford; Gerald E. Rideout, South Windsor, both of Conn.

[73] Assignee: General Signal Corporation, Rochester, N.Y.

[22] Filed: June 23, 1972

[21] Appl. No.: 265,846

[52] U.S. Cl.................. 248/131, 248/311, 248/349, 259/84
[51] Int. Cl.............................................. B01f 9/10
[58] Field of Search .......... 248/131, 415, 425, 349, 248/310, 316 B; 259/84, 85; 108/139

[56] References Cited
UNITED STATES PATENTS

| | | | |
|---|---|---|---|
| 2,552,054 | 5/1951 | Misic | 248/349 |
| 2,615,690 | 10/1952 | Jepson | 259/84 |
| 2,652,235 | 9/1953 | Samuelsen | 259/84 |
| 2,743,893 | 5/1956 | Johnston | 248/310 |
| 2,877,001 | 3/1959 | Kaufman | 259/84 |
| 2,880,951 | 4/1959 | Springer | 248/131 |

*Primary Examiner*—Marion Parsons, Jr.
*Attorney, Agent, or Firm*—Milton E. Kleinman; Harold S. Wynn

[57] ABSTRACT

A turntable is disclosed for supporting a plurality of types and sizes of bowls in such a manner that the axis of rotation of the turntable and the center line of the bowl are substantially coincident. The turntable includes one or more concentric grooves which are proportioned to mate with the feet of one type of bowl which may be supported on the turntable. A second type of bowl which may have a smooth or flat bottom is retained on the turntable by a plurality of selectively adjustable retaining members which contact an outer edge of the bowl and maintain the bowl's alignment on the turntable. The selectively adjustable members may be retained in the selected position by any convenient means such as detents. In one embodiment the members are triangular shaped wedges which may be selectively pivoted between first and second positions for retaining smooth bottomed bowls of first and second different diameters, respectively.

7 Claims, 4 Drawing Figures

BOWL SUPPORTING TURNTABLE FOR KITCHEN MIXER

BACKGROUND OF THE INVENTION

In recent decades the number and variety of appliances used in the housewife's kitchen has grown enormously. One of the widely used and popular appliances is the mixer which is used for an assortment of jobs including mixing of batter, beating eggs, whipping cream, mashing potatoes and a variety of other chores. Depending upon the volume, quantity and type of item being mixed the housewife may prefer to use a particular size, style and type of bowl. However, in the past her choice has usually been restricted to one of two bowls which are normally provided with the mixer. In use the selected bowl is customarily supported by a rotatable turntable. In order to provide uniform mixing, to prevent the rapidly revolving beaters from contacting the edge of the bowl and to prevent the bowl from being flung from the turntable by centrifugal force, it is conventional to provide some form of cooperative engagement between the bowl and the turntable to retain the bowl on the turntable in such a position that the axis of rotation of the turntable and the center line of the bowl are substantially coincident. The most common technique involves the use of mating configurations between the turntable and the bowl for positioning the bowl in the desired position. When a glass bowl is used it is usually provided with a circular ring, or foot, on the base thereof, which mates with an annular indentation of the turntable. This has, of course, meant that the bowl and the turntable must be designed to go together. In some cases the turntable for the mixer has been made of sheet metal and the outer edges thereof turned up a small amount and shaped to fit the corresponding portion of the larger bowl that may be used with the mixer.

As stated, the mixer bowl and turntable should be matched to each other. Many housewives have discovered this to their chagrin after breaking one of the bowls originally provided with the mixer and purchasing an ordinary bowl which they anticipate using as a substitute. If the substitute does not just happen to match the configuration of the turntable it will not be held in a position such that its center line is coincident with the axis of rotation of the turntable. As a consequence the rotation of the turntable will tend to fling the substitute bowl from the turntable and cause much inconvenience for the housewife.

The bowls customarily provided with kitchen mixers are made of glass and, accordingly, are subject to breakage. In view of this housewives have requested stainless steel bowls. However, ordinary stainless steel bowls are customarily formed from sheet metal of uniform thickness and therefore do not have feet to mate with the mixer turntable. One size of a flat bottomed stainless steel bowl could be used with a turntable of the type mentioned hereinabove which has turned up edges to contact the outer surface of the bowl. However, the same turntable would not properly secure a smaller flat or smooth bottomed stainless steel bowl.

In summary, it is relatively easy to maintain a proper relationship between glass bowls and a mixer turntable or between a mixer turntable and one size of flat bottomed stainless steel bowls.

Innovators in the industry have presented various solutions to permit the use of at least two sizes of flat bottomed stainless steel bowls. One solution is to provide an individual turntable for each size bowl. Another solution has been to provide adapter rings which permit the use of a small size stainless steel bowl with a turntable which is designed for use with a larger size stainless steel bowl. An entirely separate solution has been to fabricate special stainless steel bowls which have a false bottom or feet similar to those customarily found on glass bowls. These solutions to the problem have added expense and/or inconvenience to the housewife in finding and assembling the proper combination of parts. Some attempts have been made to use friction pads which will hold flat bottomed bowls. However, because the ordinary housewife does not understand the importance of aligning the axis of rotation of the turntable and the center line of the bowl and/or because the housewife has no means for gauging the accuracy of the alignment the use of friction pads has been less than satisfactory and flat bottom bowls are still flung from the turntable as a result of the centrifugal force.

SUMMARY OF THE INVENTION

The present invention solves the aforementioned difficulties and permits the use of large and small glass bowls with the customary feet and the use of different sizes of stainless steel bowls which have flat bottoms. The glass bowls are retained on the turntable in the customary manner by providing annular grooves in the turntable which mate with the feet of the glass bowls. The flat bottomed stainless steel bowls are retained on the turntable by selectively adjustable elements which contact at least a portion of the sides of the stainless steel bowl in such a manner as to align the axis of rotation of the turntable with the center line of the bowl. The selectively adjustable elements may be moved to at least two positions to accommodate the holding of at least two sizes of stainless steel bowls. By providing a larger number of positions to which the adjustable elements may be set it would be possible to accommodate other sizes of smooth bottomed bowls. The selectively adjustable elements are normally permanently attached to the turntable so that there is no possibility that they may be lost or misplaced by the housewife and so that they are instantly available for use when and if required.

When the conventional glass bowls are used the adjustable elements are set for non-contact with the glass bowl.

Having summarized the features of this structure, it is evident that a principal object of the invention is to provide a new and improved mixer turntable which will retain a variety of mixing bowls in proper orientation with respect to the turntable.

It is a more specific object of the invention to provide a mixer turntable which will retain smooth bottomed bowls and/or bowls with feet in a proper orientation on the turntable.

It is another object of the invention to provide a mixer turntable which includes first and second bowl retaining techniques.

It is another object of the invention to provide a new and improved mixer turntable which includes selectively adjustable retaining elements for retaining smooth bottomed mixing bowls in a desired orientation on the turntable.

It is another object of the invention to provide a mixer turntable which will retain at least two different sizes of at least two different types of bowls on the turntable in a desired orientation with respect to the turntable and without the use of separate parts which are not permanently associated with the turntable.

BRIEF DESCRIPTION OF THE DRAWING

Having set forth the foregoing objects, features and summary of the invention, it is believed that the operation thereof may be best understood by considering the following specification taken together with the drawing, wherein like parts are always given like numbers in all views and wherein.

DESCRIPTION OF THE PREFERRED EMBODIMENTS

Figure 1:
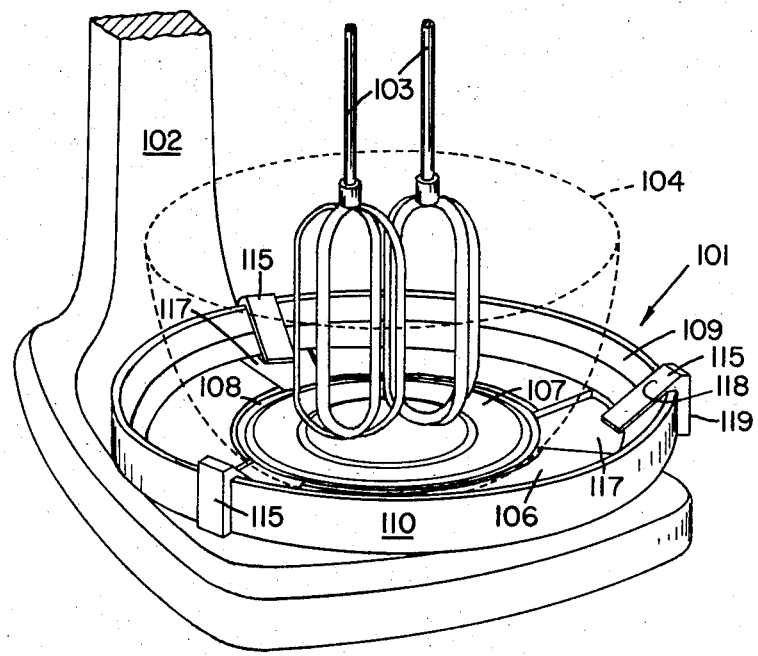
FIG. 1 is a perspective view of one embodiment of the invention.

It is believed that the invention together with its structural parts and their interaction, one with the other, can be best understood from a consideration of the drawing taken together with the following specification. Like parts shown in different figures are given the same numerical designation.

Considering now more specifically FIG. 1, there is shown therein a bowl supporting turntable 101 for a kitchen mixer which is customarily used for mixing batters, whipping cream, mashing potatoes and a wide variety of other household chores. The turntable 101 is rotatably supported on a stand 102 which supports a motor housing (not shown) which in turn supports and rotates beaters 103. Supported on the turntable 101 may be any one of a variety of mixing bowls such as the bowl 104 which is shown in dotted lines in FIG. 1.

The turntable 101 is designed to selectively retain any one of at least four different types and sizes of bowls thereon with the center line of the bowl coincident with the axis of rotation of the turntable 101.

Figure 2:
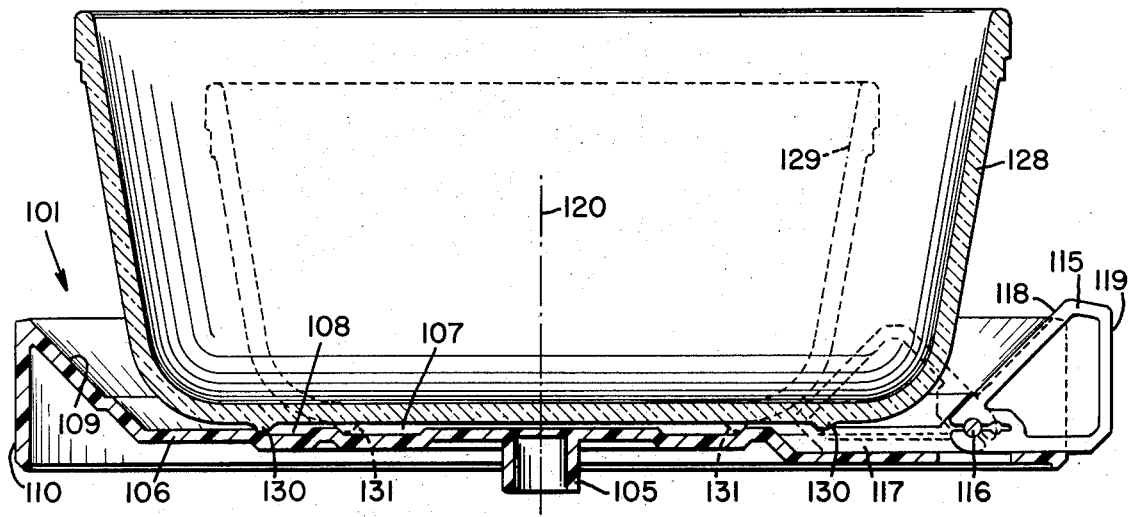
FIG. 2 is a cross section of the turntable showing two different size bowls of a first type mounted thereon.
Figure 3:
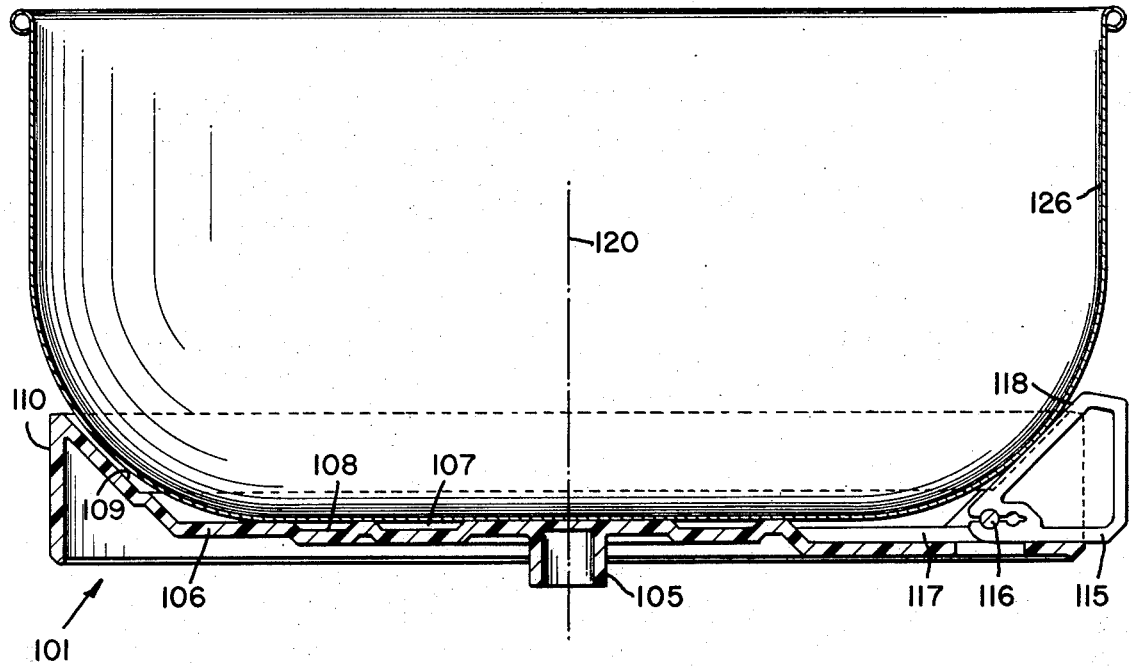
FIG. 3 is a cross section of the turntable showing a large bowl of a second type mounted thereon.
Figure 4:
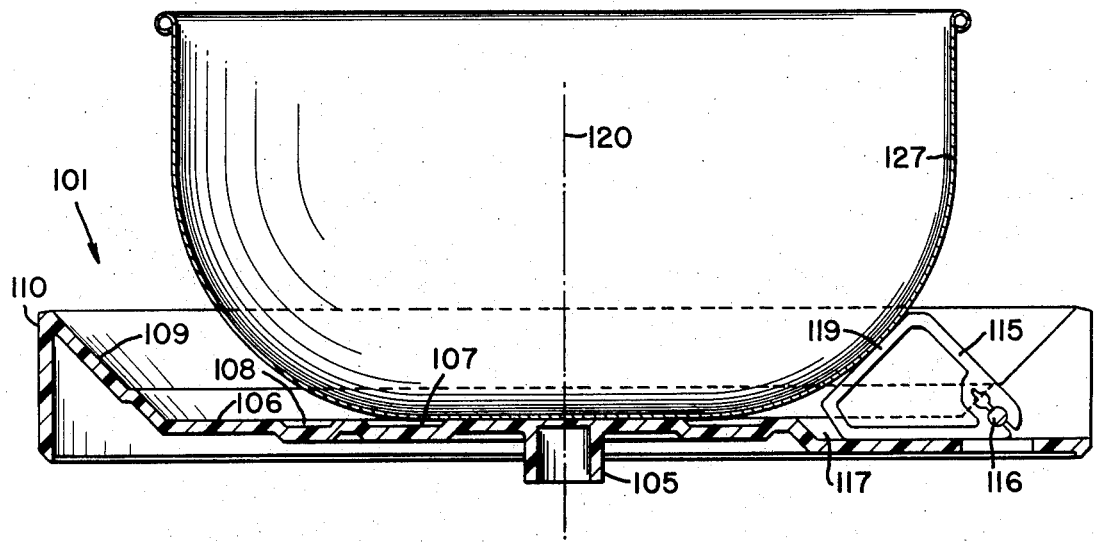
FIG. 4 is a cross section of the turntable showing a small bowl of a second type mounted thereon.

The turntable 101 may be fabricated by casting, stamping or any other conventional manufacturing technique. As may be seen in FIG. 1 the turntable 101 is circular in nature and as is seen in FIGS. 2, 3 or 4 the turntable 101 includes a hub 105 for rotationally mounting the turntable 101 on a stud (not shown) on stand 102. If desired a plurality of studs may be used on a stand 102 for altering the relative position of the axis of rotation of the turntable 101 with respect to the position of the beaters 103. Reduced friction bearing means between the hub 105 and the stud may be used if desired.

As may be seen from the various figures of the drawing although the turntable 101 lies primarily in one place it does not constitute a single plane. More specifically, the platform 106 has a pair of circular indentations which include the inner circular ring 107 and the outer circular ring 108. The outer edge of the platform 106 is formed to extend upward at an angle to form interior side 109. An outer edge 110 of the platform 106 is essentially a portion of a right circular cylinder.

Associated with the turntable 101 is a plurality of selectively adjustable bowl centering wedges 115. As may be seen in FIG. 3 the bowl centering wedge 115 may be selectively pivoted about shaft 116 to an outer position; or the bowl centering wedge 115 may be pivoted about shaft 116 to an inner position as seen in FIG. 4. At each point where one of the bowl centering wedges 115 is located the turntable 101 includes a depressed platform section 117. When the bowl centering wedges 115 are in their outer position, as shown in FIG. 3, the surface 118 of the bowl centering wedges 115 are available to provide bowl support for a bowl such as the large flat bottomed bowl 126. When the bowl centering wedges 115 are selectively pivoted, on their associated shaft 116, to the inner position so that the surface 118 rests on the depressed platform section 117 the surface 119 is presented for engaging and retaining a small flat bottomed bowl 127 on the turntable 101.

When the bowl centering wedges 115 are in their outermost position as shown in FIG. 3 their respective surfaces 118 are all equi-distant from the axis of rotation 120 of the turntable 101. Accordingly, if a flat bottomed bowl such as bowl 126 is placed on the turntable 101 while the bowl centering wedges 115 are in the position shown in FIG. 3 the bowl 126 will be aligned on the turntable 101 so that its center line is coincident with the axis of rotation 120 provided that the dimensions of the bowl 126 are such that a portion thereof will contact the bowl centering wedges 115. That is, the dimensions and location of the bowl centering wedges 115 and the shape and dimensions of the bowl 126 must be designed to be compatible. In a similar manner a smaller bowl 127 may be retained on the platform 101 when the bowl centering wedges are selectively pivoted to the position shown in FIG. 4. It will be understood that it is necessary that the bowl supported by the turntable 101 have its center line coincident with the axis of rotation 120 of the turntable 101 in order to avoid a tendency for the bowl supported by the turntable to be flung from the turntable 101 as a result of centrifugal forces.

As thus far described the turntable 101 includes bowl centering wedges 115 which are selectively pivotable between first and second positions for selectively retaining flat bottomed bowls having first and second dimensions. The flat bottomed bowls 126 or 127 may be made of any convenient material including, but not limited to, plastic and stainless steel.

The turntable 1 includes other means for retaining a second type of bowl thereon. The second type of bowl is shown in FIG. 2 as large bowl 128 and small bowl 129. The bowls 128 and 129 may be fabricated of any convenient material such as, but not limited to, glass or molded plastic. The characteristic of the class of bowls 128 and 129 which distinguishes them from the bowls 126 and 127 is the fact that the bowls 128 and 129 include circular feet 130 and 131, respectively. The circular feet 130 of the large bowl 128 are of an appropriate size and configuration to fit the outer ring 108. More specifically, the circular feet 130 and the outer ring 108 are so proportioned that they mate with each other and retain the bowl 128 on the turntable 101 in a predetermined location such that the center line of the bowl 128 is coincident with the axis of rotation 120 of the turntable 101. In a similar manner the circular feet 131 of the bowl 129 mate with the inner ring 107 in a manner to retain the bowl 129 on the turntable 101 such that the center line of the bowl 129 is maintained coincident with the axis of rotation 120 of the turntable 101. It is known in the prior art to retain at least one bowl on a turntable by making the circular foot thereof engage a circular indentation on the turntable.

If desired a single, but wider, indented ring may be used to retain the two bowls 128 and 129 on the turntable 101 with the circular feet 131 contacting the inner wall of the indented ring while the circular feet 130 contact the outer wall of the indented ring. Also it is obvious that a plurality of bowls having various depths, diameters or material may all have circular feet of the same size. Thus a single indented ring can be used to retain a plurality of bowls.

The bowl centering wedges 115 may be fabricated of any convenient material such as plastic or rubber. In the design shown the bowl centering wedges 115 are made to snap onto shaft 116. However, if desired it would be a mere matter of engineering design to design a bowl centering wedge which is not removable from its pivot support. In addition, it would be possible to provide bowl centering wedges which slide instead of pivot and are retained in two or more selective positions by some sort of ratchet engaging mechanism. If desired the bowl centering wedges 115 could be made with faces 118 and 119 which conform with the contour of the bowls with which they mate.

As may be seen in FIG. 2 the bowl centering wedges 115 do not play any part in the retaining of bowls 128 or 129 on the turntable 101. When the small bowl 129 is used the bowl centering wedges may be in either of the positions shown in FIG. 2.

From the foregoing it may be seen that the turntable 101 is adapted to permit the use of at least two different classes of bowls therewith and wherein each class of bowl may be either of at least two different sizes. Accordingly, a baker provided with a mixer equipped with a turntable of the type shown may selectively use a wider variety and class of bowls with the mixer so that a bowl size and class may be selected which exactly suits the needs of the baker.

While there has been shown and described what is considered at present to be the preferred embodiment of the invention, modifications thereto will readily occur to those skilled in the related art. For example, in another structure a plurality of sets of bowl centering wedges could be provided and/or a greater number of retaining rings could be included on the turntable. It is believed that no further analysis or description is required and that the foregoing so fully reveals the gist of the present invention that those skilled in the applicable art can adapt it to meet the exigencies of their specific requirements. It is not desired, therefore, that the invention be limited to the embodiment shown and described, and it is intended to cover in the appended claims all such modifications as fall within the true spirit and scope of the invention.

What is claimed is:

1. A bowl supporting turntable for a food mixer comprising in combination:
   a. a substantially planar turntable for selectively supporting any one of a plurality of mixing bowls some of which may have flat bottoms and some of which may have a foot, or annular rim; and
   b. a plurality of selectively adjustable members pivotally coupled to said turntable for contacting the sides of at least selected flat bottom bowls so that they may be selectively supported on said turntable to retain the contacted bowl in a predetermined position relative to the axis of said turntable when the said members are pivoted to a contacting position.

2. The combination as set forth in claim 1 wherein said adjustable members are so positioned as to retain the bowl on said turntable in a position such that the bowl's center line is substantially coincident with the axis of rotation of said turntable.

3. A food mixer comprising in combination:
   a. a turntable for selectively supporting any one of a plurality of bowls some of which may have flat bottoms and some of which may have a foot or annular rim;
   b. first and second independent bowl retaining means associated with said turntable for retaining at least two sizes of bowls with said foot portion and at least two sizes of bowls with said flat bottom, respectively, at a predetermined position relative to said turntable; and wherein
   c. said second bowl retaining means includes a plurality of selectively pivotal members coupled to said turntable for contacting a portion of the sides of said flat bottom bowls.

4. The combination as set forth in claim 3 wherein said first bowl retaining means includes mating means on said turntable for mating with the said foot portion of the bowls having a foot portion.

5. The combination as set forth in claim 3 wherein said pivotal members cooperate with the one of said flat-bottom bowls supported by said turntable for inhibiting the pivoting of said projecting members when said pivotal members are selectively adjusted to contact a portion of the side of the said flat bottom bowl supported by said turntable.

6. The combination as set forth in claim 3 wherein said second bowl retaining means cooperate with the contacted bowl for retaining it in a predetermined position wherein the axis of rotation of said turntable and the center line of the bowl supported on said turntable are substantially coincident.

7. The combination as set forth in claim 6 wherein said first bowl retaining means includes means on said table for mating said the said foot portion of the bowls having a foot portion.

* * * * *